United States Patent [19]

Gray, III et al.

[11] Patent Number: 4,925,622
[45] Date of Patent: May 15, 1990

[54] TREADABLE INSULATION SYSTEM WITH LAGGING SUPPORT

[75] Inventors: Latham B. Gray, III, Mecklenburg County, N.C.; Gordon H. Hart, Johnson County, Kans.

[73] Assignee: Performance Contracting, Inc., Charlotte, N.C.

[21] Appl. No.: 114,223

[22] Filed: Oct. 27, 1987

[51] Int. Cl.$^5$ .............................................. G21C 11/08
[52] U.S. Cl. ...................... 376/289; 138/149; 248/49
[58] Field of Search ................ 376/291, 289; 138/149, 138/147; 248/49

[56] References Cited

U.S. PATENT DOCUMENTS

| | | | |
|---|---|---|---|
| 2,707,493 | 5/1955 | Bonvillian et al. | 138/149 |
| 3,889,715 | 6/1975 | Lilja et al. | 138/149 |
| 4,009,735 | 3/1977 | Pinsky | 138/149 |
| 4,014,369 | 3/1977 | Kobres, Jr. | 138/149 |
| 4,393,569 | 7/1983 | Byrd, Jr. | 138/149 |
| 4,436,119 | 3/1984 | Shahan et al. | 138/149 |
| 4,590,971 | 5/1986 | Webster et al. | 138/149 |
| 4,732,177 | 3/1988 | Maus et al. | 376/291 |

FOREIGN PATENT DOCUMENTS 2658741 6/1978 Fed. Rep. of Germany ...... 376/291

Primary Examiner—Daniel Wasil
Attorney, Agent, or Firm—Louis T. Isaf

[57] ABSTRACT

An insulation system including support for lagging, especially metal lagging, supports lagging at a distance above industrial piping and prevents fibrous insulation, used to insulate the piping, from being compressed and eventually significantly damaged by foot traffic, thus creating a treadable insulation system with valuable application in nuclear reactor containment areas.

21 Claims, 2 Drawing Sheets

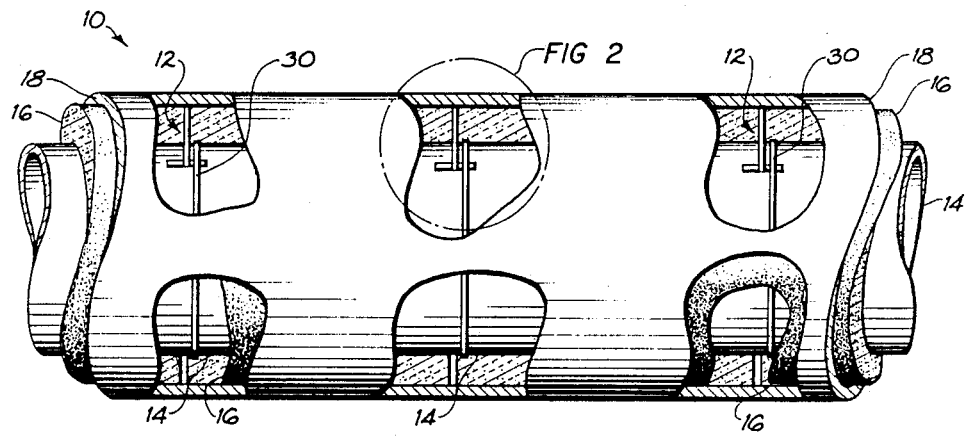
FIG 1
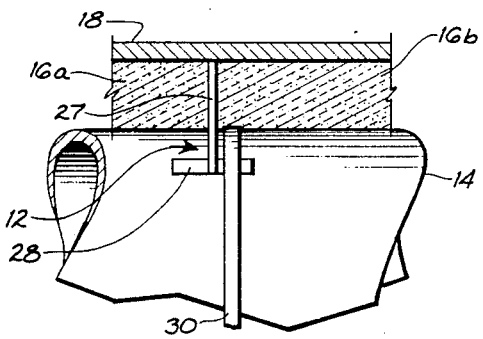
FIG 2
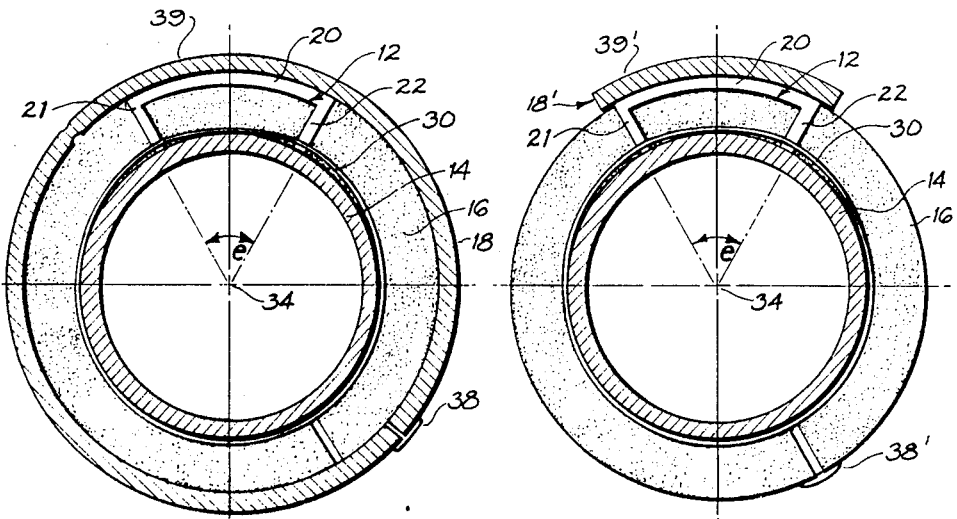
FIG 3    FIG 4

TREADABLE INSULATION SYSTEM WITH LAGGING SUPPORT

FIELD OF THE INVENTION

The present invention relates generally to systems for insulating industrial piping and, more specifically, to the protection of such insulation from damaging effects of foot-traffic.

BACKGROUND OF THE INVENTION

Industrial piping, for example large fluid transporting pipes found in nuclear power plants or steam generated plants, are typically insulated. There are a number of different types of insulation, each of which finds acceptable application in specific environments. It so happens that, in certain circumstances, segments of the piping must be walked on by maintenance and inspection personnel. The foot traffic so generated, especially over long periods of time, can have a damaging effect on the insulation. A solution to insulation damage in some industry environments has been the insulating of pipes utilizing rigid insulation such as insulation made of calcium-silicate, especially in areas where foot traffic is expected. In other environments all-metal insulation is utilized. Although in practice, the metal insulation still compresses under foot traffic, the solution in such an environment was to weld an additional metal plate on top of the metal insulation to give extra strength to the traffic area.

Unfortunately, the above mentioned calcium-silicate insulation and all-metal insulation do not find universal application in industry. In many environments and applications, it remains appropriate and desirable to utilize fibrous, mass pipe insulation. One example of an environment in which fibrous insulation is desirable is the environment of a nuclear containment area. The nuclear containment area of a nuclear power plant is "a different world" strictly defined by rules and regulations. Attention is directed to U.S. Pat. No. 4,009,735 to Gordon Pinsky which speaks of insulation needs within a nuclear environment and discloses one type of insulation finding acceptance for use in the nuclear containment area. In certain applications of the Pinsky insulation the fibrous, glass encapsulated mass insulation is encircled by a removable metal jacket (or lagging). Although this jacket is typically made of metal, it is not sufficiently rigid to withstand long periods of foot traffic and, thus, extended foot traffic can create permanent damage to the underlying fibrous insulation. In other applications, the fibrous insulation is not jacketed and the only way to protect such insulation from foot traffic in the prior art appears to be removal of the insulation from the piping.

SUMMARY OF THE INVENTION

Briefly described, the present invention comprises a fibrous insulation system which defines a treadable region which will endure foot traffic without significant damage to the fibrous insulation. The treadable region comprises a segment or segments of lagging and is supported above the fibrous insulation by a plurality of support apparatuses which are spaced apart at intervals along the pipe. In the preferred embodiment of the present invention, the lagging completely encircles the fibrous insulation and the pipe to form a "jacket" around the insulation and pipe; and the support apparatuses support only a portion of the jacket as the treadable region. Each of the support apparatuses of the preferred embodiment of the present invention includes a brace member which is supported at a distance from the pipe by leg members which rest against the pipe and extend radially out from the pipe to the brace member; and also include protruding feet which are banded to the pipe using a circumferential band clamp.

It is, therefore, an object of the present invention to provide an insulation system of fibrous insulation having a segment which bears foot traffic without damaging the fibrous insulation.

Another object of the present invention is to provide a jacketed, fibrous insulation combination and a region of the jacket which will bear foot traffic without significant damage to the fibrous insulation.

Still another object of the present invention is to provide an apparatus for supporting a walkway or other foot traffic bearing region at a maintainable distance off of a pipe.

Other objects, features and advantages of the present invention will become apparant upon reading and understanding of this specification when taken in conjunction with the accompanying drawings.

BRIEF DESCRIPTION OF THE DRAWINGS

FIG. 1, is a side view of the support system of the present invention, showing a typical, limited, horizontal run of pipe and foot traffic region.

FIG. 2, is an isolated view of the segment marked "2" of FIG. 1.

FIGS. 3, is an end view of the lagging support system of the present invention showing one embodiment of the pipe, insulation and lagging support combination in accordance with the present invention, including a jacket.

FIG. 4, is an end view of the lagging support system showing a second embodiment of the pipe, insulation and support system combination in accordance with the present invention, including a limited region of lagging.

DETAILED DESCRIPTION OF THE PREFERRED EMBODIMENT

Referring now in greater detail to the drawings in which like numerals represent like components throughout the several views, FIG. 1 shows a preferred embodiment of the Treadable Insulation System With Lagging Support 10 of the present invention, which embodiment includes a plurality (three shown) of support apparatuses 12 supported from a pipe 14. Each support apparatus 12 is seen as being positioned between two adjacent insulation segments. Lagging 18 overlies the insulation segments 16.

Figure 5:
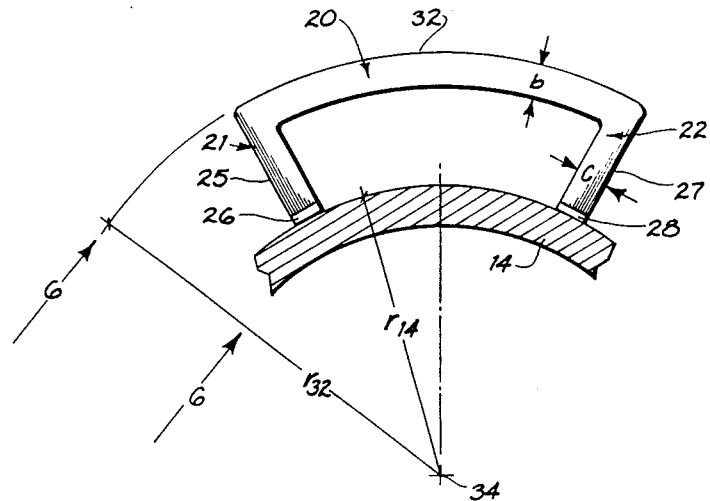
FIG. 5, is an end view of a lagging support apparatus in accordance with the present invention, mounted on a pipe.
Figure 6:
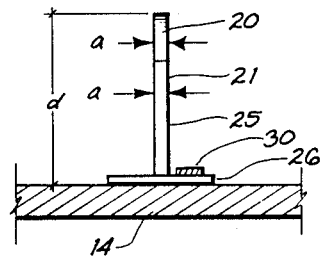
FIG. 6, is an end view of the lagging support apparatus of the present invention, taken along view 6—6 of FIG. 5.

With reference to FIGS. 1, 2, 5 and 6, the preferred embodiment of the lagging support apparatus 12 is seen as including a brace member 20 and two leg members 21, 22. The left leg member 21 (as viewed in FIG. 5) includes a spacer element 25 and a foot element 26. The right leg member 22 (as viewed in FIG. 5) includes a spacer element 27 and a foot element 28. Each support apparatus 12 also includes a band clamp 30 which encircles the pipe 14 and overlies the foot elements 26, 28 of the leg members 21, 22. The band clamp 30 is tightened about the pipe, as through the action of a buckle or like cinching mechanism (not shown) to sandwich the foot elements 26, 28 tightly between the pipe 14 and band clamp 30. The brace member 20 of each support apparatus 12 is of any desired configuration; however, in the preferred embodiment, the brace member 20 defines a thin, arcuate beam extending between the two leg members 21, 22 and defining an arc-shaped top edge 32. Furthermore, although other designs of the leg members 21, 22 are acceptable, it is preferred that the spacer elements 25, 26 define thin plates and that the foot elements 26, 28 protrude sufficiently beyond the spacer elements 25, 27 to be engaged by the band clamp 20 and to resist tipping of the leg members 21, 22. When choosing dimensions for the brace member 20 and leg members 21, 22, it is preferable to maintain a narrow thickness (dimension "a" of FIG. 6) for the brace member 20 and spacer elements 25, 27, in order to displace as little area as possible between the adjacent insulation segments 16. The width of the spacer element 25, 27 (dimension "c" of FIG. 5) and the width of the brace member 20 (dimension "b" of FIG. 5) are preferrably narrow to displace a minimum amount of insulation 16. Yet, the above dimensions are wide enough to give structural support to the respective leg members 21, 22 and brace members 20; bearing in mind that these support apparatuses 12 will be supporting the weight of one or more persons. An example of dimensions found to be appropriate are as follows: dimension "a"-1/16 inch; dimension "b"-⅜; and dimension "c"-¾ inch. In the preferred embodiment, the brace member 20 and leg members 21, 22 are formed as a single, unitary, precast structure. In alternate embodiments, the leg members 21, 22 are manufactured separate from the brace member 20 and are attached to the brace member by various techniques of clipping or snapping together. The overall height of the leg members 21 or 22 and brace member 20 (dimension "d" of FIG. 6) is, preferably, equal to the thickness of the insulation segments 16.

In the preferred embodiment of the present invention, the support apparatuses 12 are matched in angular dimension to a specific pipe size. That is, the arc of the arc-shaped top edge 32 of the brace member 20 is preferably defined with a center of curvature which is the same as the center of curvature 34 of the pipe 14, once the support apparatus 12 has been placed on the pipe. Furthermore, the leg members 21, 22 each extend radially from the brace member 20 toward that same center of curvature 34. Once assembled in accordance with the preferred embodiments of the present invention, as depicted in the drawings, each support apparatus 12 is positioned on the pipe, and is so formed, such that: the left leg member 21 and right leg member 22 are circumferentially displaced from one another along an arc of the pipe 14; the brace member 20 and spacer elements 25, 27 of the two foot members 21, 22 lie within the same plane which is perpendicular to the axis of the pipe; and the foot elements 26, 28 each extend from their respective spacers 25, 27 at least in a direction axially along the pipe.

The scope of the present invention is not to be limited by strict and unvariable definition of geometric terms such as parallel, perpendicular, arc, radial, common center of curvature, etc. Rather, any such terms used throughout this specification and claims are intended to give general definition to the relationship between system components and such terms are deemed to include approximations thereof (for example, approximately parallel; approximately the same center of curvature, etc.).

The insulation segments 16 of the preferred embodiments are blankets of insulation, each segment comprising a single blanket of defined thickness (dimension "d") which completely encircles the pipe 14 and abuts an adjacent insulation segment 16. In one embodiment of the present invention (see FIG. 3), the lagging 18 is metal lagging in the form of a jacket which overlies two or more of the insulation segments 16 and completely encircles the insulation and pipe. In this jacketed embodiment, the insulation blanket is held about the pipe 14 by the jacket 18; and the jacket is removably snapped closed by a clasp assembly 38. With reference to FIG. 3, it is seen that, in this jacketed embodiment, only a limited region 39, that region expected to receive foot traffic, of the metal lagging jacket 18 is supported by the support apparatuses 12. An acceptable angular width of the supported region 39 is sixty degrees of arc (angular dimension "e" of FIG. 3). In this jacketed embodiment of FIG. 3, the insulation blankets 16 and the metal lagging jackets 18 are not attached to the support apparatuses 12; and, therefore, the entire insulation combination is easily removed from the pipe 14. The spacing between the support apparatuses 12 along the pipe 14 is dictated by the width of the respective insulation segment 16, since it is intended that an insulation segment 16 occupies the space between two adjacent support apparatuses 12 while still abutting the next adjacent insulation segment. It is within the scope of alternate embodiments that two or more insulation segments 16 occupy the space interval between adjacent support apparatuses 12. However, since it is a goal of the present invention to give support to the lagging 18, such that as an individual treads upon the lagging between support apparatuses 12 the lagging will not be deflected so far as to significantly impact the insulation material 16, it is desirable to maintain a relatively narrow spacing between the support apparatuses 12. An example of an acceptable spacing between adjacent support apparatuses 12 is twenty-four inches.

An alternate embodiment of the Treadable Insulation System With Lagging Support 10 of the present invention is seen in FIG. 4, which depicts an embodiment in which the fibrous insulation segments 16 are not completely encircled by the metal lagging jacket 18. In such an embodiment, the insulation blankets 16 encircle the pipe 14 and are held about the pipe by a tape or clasping device 38'. In this embodiment, a limited segment of metal lagging 18' overlies the insulation segments 16 extending from support apparatus 12 to support apparatus 12 to define the supported, treadable region 39' for bearing foot traffic. In this embodiment, the metal lagging 18' is clipped or otherwise removably held to the support apparatuses 12 to prevent sliding.

Whereas this invention has been described in detail with particular reference to preferred embodiments thereof, it is understood that variations and modifications can be effected within the spirit and scope of the invention, as described in the foregoing specification and as defined in the appended claims.

We claim:

1. In combination:
   a cylindrical pipe;
   a plurality of insulation segments placed end-to-end along said pipe, each said insulation segment at least partially encircling said pipe;

at least one jacket member overlying said plurality of insulation segments;

a plurality of jacket support assemblies, said plurality of jacket support assemblies combining to support at least a portion of said jacket member at least a minimum distance from said pipe;

said jacket support assemblies of said plurality of jacket support assemblies being positioned on said pipe at spaced apart intervals along the length of said pipe, each said interval corresponding to the length of at least one of said insulation segments;

said interval between two adjacent support assemblies being occupied by at least one of said insulation segments;

each said jacket support assembly of said plurality of jacket support assemblies comprising, at least:

a brace member including, at least, a top edge and opposing end portions;

first leg member attached to one end portion of said brace member and protruding from said brace member;

second leg member attached to the other end portion of said brace member and protruding from said brace member;

said first leg member and said second leg member protruding from said brace member in a radial direction toward a common center of curvature;

said first leg member and said second leg member being positioned adjacent said pipe and maintaining said top edge of said brace member at a predefined distance from said pipe; and clamping means for holding said first leg member and said second leg member in position adjacent said pipe.

2. The combination of claim 1, wherein each of said first and second leg members includes, at least, a foot element in contact with said pipe and a spacer element extending from said foot element to said brace member, and wherein said clamping means comprises a band element encircling said pipe and binding said foot element of said first leg member and said foot element of said second leg member between said band element and said pipe.

3. The combination of claim 2, wherein each said jacket support assembly is positioned on said pipe in such a manner that said first leg member and said second leg member are circumferentially displaced from one another about said pipe; and wherein each said foot element extends from its respective said spacer element axially along said pipe.

4. The combination of claim 1, wherein said predefined distance at which said top edge of each said brace is maintained corresponds to the unloaded height of one of said insulation segments.

5. The combination of claim 8, wherein said arcuate top edge of said brace member of each said jacket support assembly defines an arc which is concentric with the cylinder of said pipe when said jacket support assembly is positioned on said pipe.

6. Combination of claim 1, wherein said first leg member and said second leg member are irremovably attached to said brace member.

7. Combination of claim 6, wherein said first leg member, second leg member and brace member are formed as a single, unitary member.

8. Combination of claim 1, wherein said top edge of said brace member is arcuate, defining an arc whose center of curvature is said common center of curvature toward which said leg members protrude.

9. In an insulated pipe system including a cylindrical pipe, end-to-end abutting segments of blanket insulation encircling the pipe, and a jacket member overlying said end-to-end blanket segments, the improvement thereto comprising:

a plurality of jacket support assemblies, said plurality of jacket support assemblies combining to support at least a portion of said jacket member at least a minimum distance from the pipe;

said jacket support assemblies of said plurality of jacket support assemblies being positioned on said pipe at spaced apart intervals along the length of said pipe, each said interval corresponding to the length of at least one of said insulation segments;

said interval between two adjacent jacket support assemblies being occupied by at least one of the insulation segments.

each said jacket support assembly of said plurality of jacket support assemblies comprising, at least:

a brace member including, at least, an arcuate top edge and opposing end portions;

first leg member attached to one end portion of said brace member and protruding from said brace member;

second leg member attached to the other end portion of said brace member and protruding from said brace member;

said first leg member and said second leg member protruding from said brace member in a radical direction toward a common center of curvature;

said first leg member and said second leg member being positioned adjacent said pipe and maintaining said top edge of said brace member at a predefined distance from said pipe; and clamping means for holding said first leg member and said second leg member in position adjacent said pipe.

10. The improvement of claim 9, wherein each of said first and second leg members includes, at least, a foot element in contact with the pipe and a spacer element extending from said foot element to said brace member, and wherein said clamping means comprises a band element encircling the pipe and binding said foot element of said first leg member and said foot element of said second leg member between said band element and the pipe.

11. The improvement of claim 9, wherein each said jacket support assembly is positioned on the pipe in such a manner that said first leg member and said second leg member are circumferentially displaced from one another about the pipe; and wherein each said foot element extends from its respective said spacer element axially along the pipe.

12. The improvement of claim 9, wherein said predefined distance at which said tope edge of each said brace is maintained corresponds to the unloaded height of one of the insulation segments.

13. The improvement of claim 9, wherein said arcuate top edge of said brace member of each said jacket support assembly defines an arc which is concentric with the cylinder of said pipe when said jacket support assembly is positioned on said pipe.

14. Improvement of claim 9, wherein said first leg member and said second leg member are irremovably attached to said brace member.

15. Improvement of claim 14, wherein said first leg member, second leg member and brace member are formed as a single, unitary member.

16. Improvement of claim 9, wherein said top edge of said brace member is arcuate, defining an arc whose center of curvature is said common center of curvature toward which said leg members protrude.

17. A treadable length of thermal insulation for use on industrial piping such as piping within a nuclear power plant, said insulation comprising:
   a plurality of insulation segments for end-to-end placement along a pipe and for at least partially encircling a pipe;
   at least one jacket member for overlying said plurality of insulation segments placed on the pipe;
   a plurality of jacket support assemblies for placement between adjacent ones of said insulation segments and for placement upon a pipe to support said jacket member at a distance from the pipe,
   each said jacket support assembly of said plurality of jacket support assemblies comprising, at least:
      a brace member including at least two opposing end portions and a top edge on which to support lagging;
      first leg member attached to and protruding from one end portion of said brace member;
      second leg member attached to and protruding from the other end portion of said brace member;
      said first leg member and said second leg member protruding from said brace member in a radial direction toward a common center of curvature;
      each said leg member including, at least, a spacer element engaging said brace member and a foot element extending from said spacer element; and
      a clamping means for holding said first foot element and said foot element in a position adjacent a pipe.

18. Insulation of claim 17, where in each said foot element of each said leg member extends in a plane perpendicular to the radial direction of its respective spacer element and wherein said foot element of each said leg member extends at least in an axial direction, which axial direction is perpendicular to a plane defined between said first and second leg members; and wherein said clamping means comprises a band element for encircling a pipe and for binding said foot elements of said first and second leg numbers between said band element and a pipe.

19. Insulation of claim 17, wherein said top edge of said brace member is arcuate defining an arc whose center of curvature is said common center of curvature toward which said leg members protrude.

20. Insulation of claim 17, wherein said first leg member and said second leg member are irremovably attached to said brace member.

21. Insulation of claim 20, wherein said first leg member, second leg member and brace member are formed as a single, unitary member.

* * * * *